TWO-STAGE GROUP SELECTOR CIRCUIT

Filed Oct. 7, 1950 7 Sheets-Sheet 1

Inventor
MARTINUS DEN HERTOG
By Robert Harding Jr.
Attorney

April 19, 1955 M. DEN HERTOG 2,706,748

TWO-STAGE GROUP SELECTOR CIRCUIT

Filed Oct. 7, 1950 7 Sheets-Sheet 2

Inventor
MARTINUS DEN HERTOG

By Robert Harding Jr.
Attorney

April 19, 1955 M. DEN HERTOG 2,706,748

TWO-STAGE GROUP SELECTOR CIRCUIT

Filed Oct. 7, 1950 7 Sheets-Sheet 3

Inventor
MARTINUS DEN HERTOG
By Robert Harding Jr.
Attorney

April 19, 1955 M. DEN HERTOG 2,706,748

TWO-STAGE GROUP SELECTOR CIRCUIT

Filed Oct. 7, 1950 7 Sheets-Sheet 4

Inventor
MARTINUS DEN HERTOG

By Robert Harding Jr.
Attorney

April 19, 1955 M. DEN HERTOG 2,706,748

TWO-STAGE GROUP SELECTOR CIRCUIT

Filed Oct. 7, 1950 7 Sheets-Sheet 5

Inventor
MARTINUS DEN HERTOG

By Robert Harding Jr.
Attorney

Inventor
MARTINUS DEN HERTOG
By Robert Harding Jr.
Attorney

April 19, 1955 M. DEN HERTOG 2,706,748

TWO-STAGE GROUP SELECTOR CIRCUIT

Filed Oct. 7, 1950 7 Sheets-Sheet 7

Inventor
MARTINUS DEN HERTOG
By Robert Harding Jr.
Attorney

United States Patent Office 2,706,748

Patented Apr. 19, 1955

2,706,748

TWO-STAGE GROUP SELECTOR CIRCUIT

Martinus den Hertog, Antwerp, Belgium, assignor to International Standard Electric Corporation, New York, N. Y., a corporation of Delaware Application October 7, 1950, Serial No. 188,932

Claims priority, application France October 7, 1949

15 Claims. (Cl. 179—18)

The present invention relates to automatic and semi-automatic telecommunication systems and more particularly two-stage group selection equipments employed in said systems. In this type of selector, a "primary" switch is provided to select, in response to a selection signal or a combination of signals, a free secondary switch giving access to a group of outlets comprising at least one free circuit, the secondary switch chosen then selecting one free outlet in said group in accordance with a method indicated in U. S. application, Serial No. 778,657, filed October 8, 1947.

The object of the present invention is to permit the operation of all the outlets of one selection stage with the maximum efficiency, that is to say as if they were operating, for a particular direction, as an ideal group.

One of the characteristics of the invention consists of a two-stage group selection equipment in which interconnections are provided between the primary and secondary switches and multipled connections of the outlets on the secondary switches, as are also arrangements for testing the outlets, these arrangements being such that two primary switches cannot seize and maintain in engagement two secondary switches in order to have access to the same group of outlets when a single outlet of said group is available for each of the two secondary switches and when the said outlets available to each of the two secondary switches are the same.

Another characteristic of the invention consists of a two-stage group selection equipment comprising electronic devices for scanning the outlets of all the secondary switches connected to the outlets of a single primary switch.

Another characteristic of the invention consists in a two-stage group selection equipment comprising electronic devices for successively testing the availability of the outlets of all the secondary switches connected to the outlets of a single primary switch.

Another characteristic of the invention consists of a two-stage group selection equipment comprising signalling devices for producing electrical impulses situated in time and provided in order to signal the condition (free or busy) of the groups of outlets of the secondary switches, means being provided to register the similar digits or selection signals, test equipment also being provided in order to select a free secondary switch by detecting a signal composed of an impulse transmitted in a particular time unit by the setting of the registering devices.

Another characteristic of the invention consists of a two-stage group selection equipment comprising test devices and test circuit employed to select a free outlet of a switch of the first stage, arrangements being made to interconnect, via the switches of the first and second stage, the said test devices with the outlets of said switches of the second stage, the condition of the outlets of the switches of the second stage being directly testable by setting the switches of the first stage in position.

Another characteristic of the invention consists of a two-stage group selection equipment comprising electronic signalling devices associated with each switch of the second stage in order successively to signal to the switches of the first stage connected therewith, the state of availability of each of the various groups of outlets connected to said switch of the second stage.

Another characteristic of the invention consists of a two-stage group selection equipment comprising devices for recording similar digits or selection signals associated with a switch of the first stage, test devices associated with a switch of the first stage being provided in order to select a switch of the second stage by comparing the group availability signals received from the switches of the second stage with the position of said devices for recording digits or similar signals.

Another characteristic of the invention consists of signalling devices associated with each secondary switch comprising signalling devices common to a certain number of switches of the second stage on which are multipled the same set of outlets.

Another characteristic of the invention consists in artificially busying a group of outlets multipled on several secondary switches, from the moment in which one of said secondary switches is selected in order to establish a connection to an outlet of said group, until one of said outlets is seized and engaged through said secondary switch.

Another characteristic of the invention consists of a common control circuit associated with a group of secondary switches on which is multipled the same set of outlets, test wires special to each of said outlets being provided as also a common test wire, in said common control circuit, to which said individual wires are connected, means being provided in order to send electrical impulses differently situated in time to said common test wire, one for each different group of outlets in said set of outlets, and means also being provided to send an electrical impulse in a time unit characterising a particular group of outlets only when at least one of said circuits of said group is free.

The arrangement in accordance with the preceding characteristic may be provided in combination with means for sending an impulse on each individual test wire in a time unit characterising the group of outlets to which said individual wire belongs, a group impulse being sent to the common test wire when at least one of the outlets of said group is free. In accordance with one embodiment the availability of an outlet of a secondary switch is indicated by a direct potential and the individual test wires of the outlets of the same group which may be reached through a secondary switch are multipled together on an electronic impulse scanning device special for said group, group impulses being sent in different time units in a cycle of group impulses through said group wires which are in turn multipled on said common test wire.

Another characteristic of the invention consists of a two stage group selection equipment comprising an electronic impulse scanning device associated with each primary switch and to which the test wires of all the secondary switches connected to said primary switch are connected, said scanning device being provided in order to produce, from the group impulses of the same time cycle, sent on the test wires of the various secondary switches, a cycle of impulses situated in time equal in number to that of all the group impulses on the said test wires, the position of each impulse situated in time characterising a group of outlets, as also the secondary switch from which the said group signal comes, said impulse cycle being sent to a test equipment, devices for recording similar digits or selection signals being provided in order to control said group test equipment and to detect the first impulse of said cycle characterising a free circuit in the desired group, means being provided in order to record the identity of the secondary switch from which the detected impulse is coming, said means controlling the operation of the primary switch in order to connect it to the secondary selector of which the identity has been registered.

Another characteristic of the invention consists of a two-stage group selection equipment comprising an electronic impulse scanning device associated with each secondary switch and arranged to produce, from group impulses of the same time cycle sent on the individual test wires of the different free outlets, a series of impulses situated in time equal in number to that of the group impulses sent on the individual test wires, the position in time of each impulse identifying the group of outlets and the individual outlet, a signalling circuit being provided in order to permit the passage of said series of impulses to a group test equipment employed for operating the primary switches, said group test equipment being adapted to detect the first impulse of said series which characterises a free outlet in the same desired group, means being provided to register the identity of the outlet from which the detected impulse is coming, said means controlling the operation of the secondary switch in order to connect it to the outlet of which the identity has been registered.

Another characteristic of the invention consists in the fact of automatically sending a condition of absorption of impulses to the signalling devices, composed of electrical impulses situated in time, as soon as the corresponding secondary switch has been selected, two secondary selectors having access to only one free outlet in the desired group not being engageable by two different primary switches in order to effect connections in the said group.

Another characteristic of the invention consists in automatically maintaining a condition of absorption of impulses until a free outlet in the desired group has been selected and engaged in the chosen secondary switch.

Another characteristic of the invention consists in the fact that the secondary switches having access to the same groups of outlets are distributed in sets of which different sections of groups of outlets are multipled, two secondary switches of the same set not being connectable to the same test position in the different primary switches, so as to prevent simultaneous testing in the same section.

Another characteristic of the invention consists in the fact that the secondary switches of the same set are connected in such a way to the outlets of the primary switches that the same impulse situated in time cannot be allocated to two of said secondary switches by the impulse scanning devices.

Various other characteristics will appear from the following description given as a non-limitative example with reference to the attached drawings in which.

Figure 3:
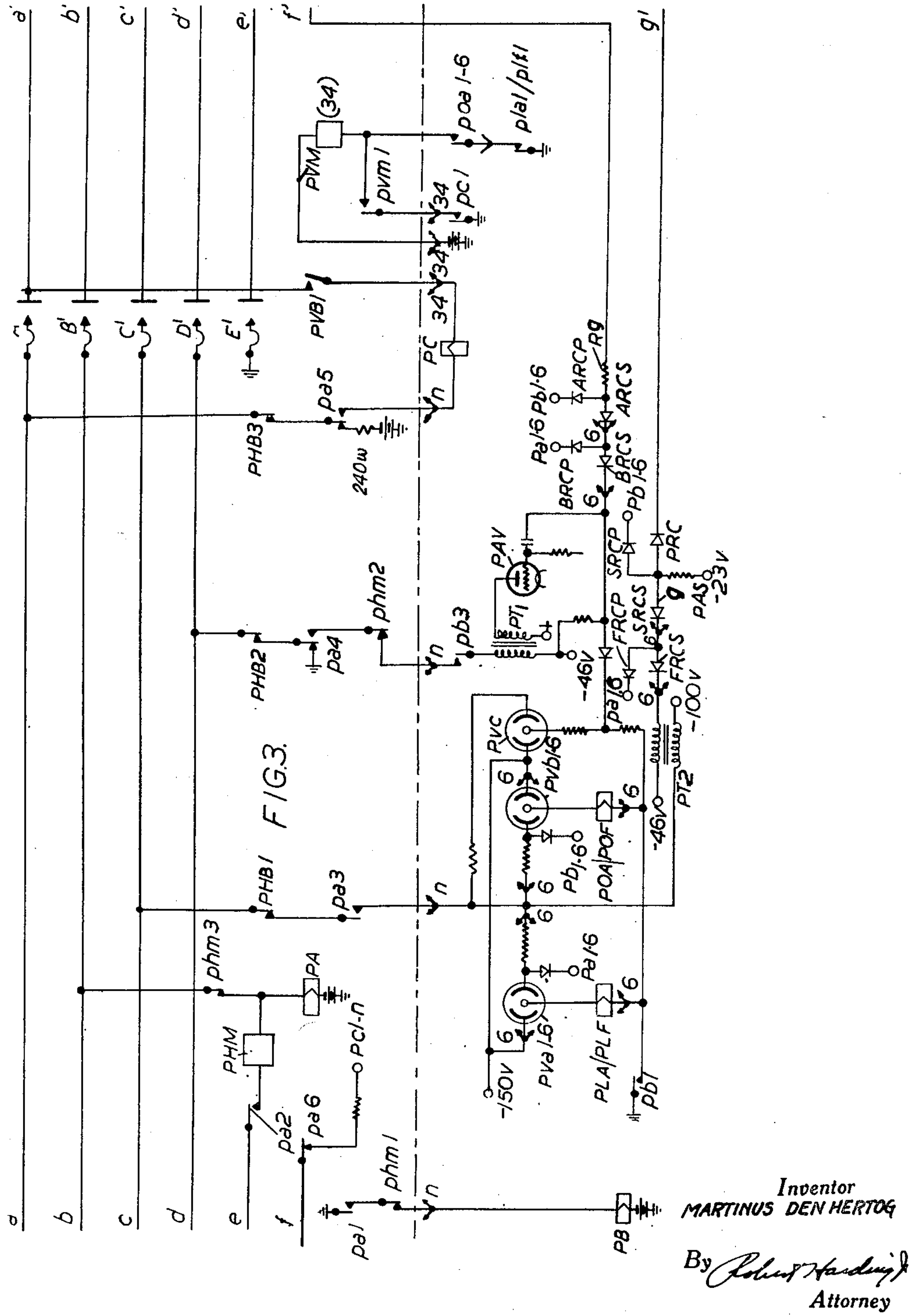
Fig. 3 shows the individual circuit of an individual primary group selector in a multi-switch and the common control circuit for a multi-switch comprising several primary group selectors.
Figure 4:
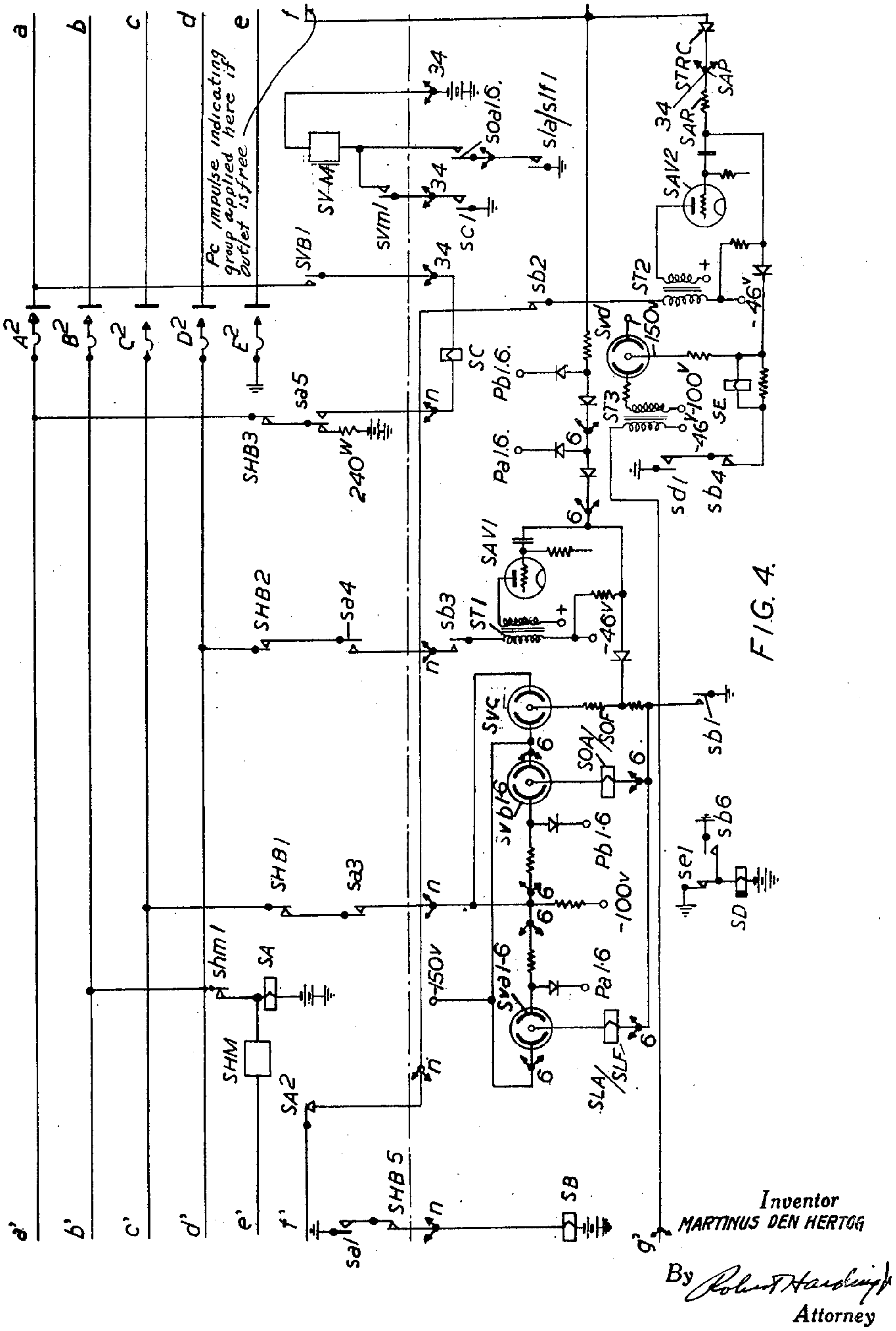
Fig. 4 shows the individual circuit of a secondary group selector in a multi-switch and the common control circuit for a multi-switch comprising several secondary group selectors.
Figure 8:
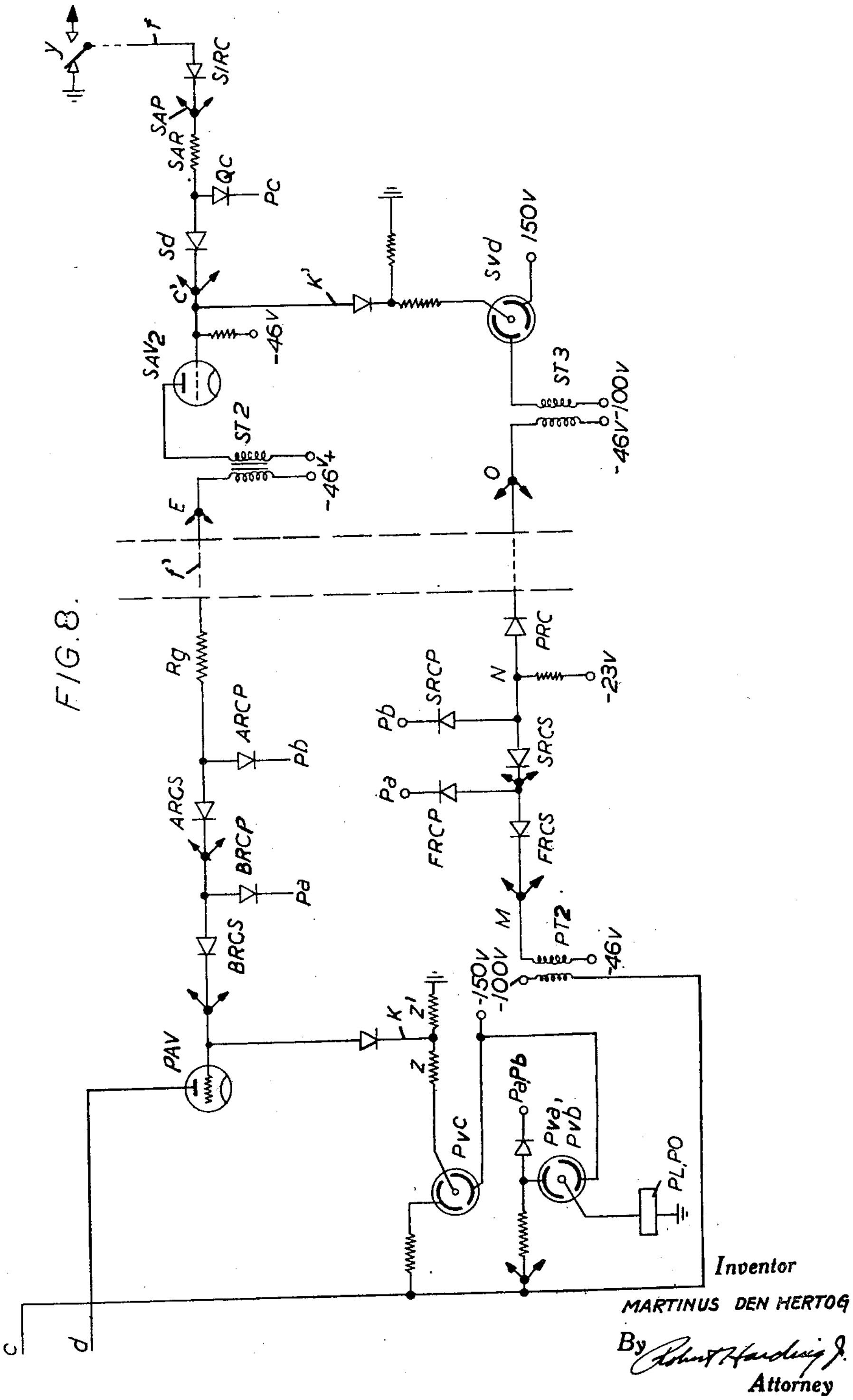

Fig. 8 shows the test circuit taken from Figs. 3 and 4, but modified to permit the use of ground and battery potentials for the free and busy conditions of the outlets, a primary switch being arranged for testing the availability of a group of outlets of a secondary switch, said Fig. 8 also showing circuits taken from the primary and secondary switches for preventing the double seizure of a single free outlet in the desired group.

Figure 9:
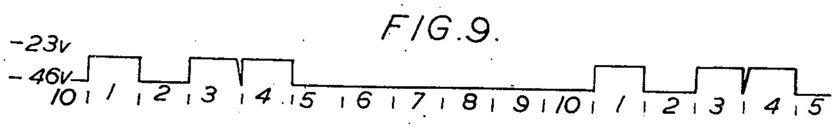

Fig. 9 shows an example of a series of impulses sent back from a secondary switch to the test circuit of Fig. 8.

Figure 10:
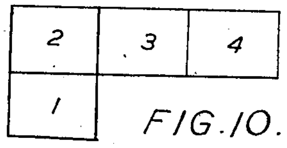

Fig 10 shows the method of connection of Figs. 1 to 4.

The object of the circuits of primary selectors and secondary group selectors is to effect the selection of a free outlet, within a group selected from several groups, under the control of a register in accordance with the corresponding digit of the desired subscriber's number and in the most economical manner.

These circuits are based on the use of a multi-switch which comprises a certain number of horizontal bars each of which may be regarded as representing an individual switch capable of handling a call in a similar manner to that of the well known single movement switch. 34 outlets have been provided common to all the individual switches and accessible to said switches. Vertical bars have also been provided which cross all the horizontal bars and control the selection of a particular outlet which has to be connected to an individual switch by the action of the horizontal bar which is associated therewith. The operation of the multiswitch will be described later in a more detailed manner.

A certain number of individual switches is provided which varies with the traffic requirements, each of them being adapted to be used independently to establish a connection to a free outlet.

Each of the switches has an individual selector circuit comprising a horizontal magnet PHM or SHM forming part of the multiswitch and a relay PA or SA.

A common control circuit has been provided common to all the individual selectors of a group forming a multi-switch. This circuit, by employing electronic means, has also a certain number of periodic cycles of electrical impulses, and under the control of a register, can carry out selection operations for one of the individual selectors and control the operation of a vertical bar and of a horizontal bar of the multiswitch in order to complete the connection engaged by the call when the outlet has been seized.

The equipment and circuits of the common control circuit are always the same and are not dependent upon the manner in which the outlets are distributed in the various groups.

The register controller comprises a device for recording digits of any known type; the circuits employed to connect the register controller with the selector may also be carried out in accordance with a well known method.

Consequently, it will be assumed that the digits forming the number of the desired line have been received and registered and that the register controller (Fig. 1) has been connected to the first stage of selection (Fig. 3) through the wires *a, b, c, d*. It will also be assumed that the register controller is arranged in a known manner and in such a way that the operation of two successive stages of selection is controlled by one digit only, for example by connecting successive positions of a selection sequence switch to the register device of the same digit.

The operation of the circuits indicated in the various drawings will now be described in a detailed manner.

The earth applied through the back contact *ok*5 (Fig. 1) and the wire *b* causes the operation of the relay PA in the primary group selector through a back contact *phm*3 associated with the horizontal magnet PHM; it also causes the operation of the relay CH in the register.

Relay PA, in operating immediately causes the connection of the group selector circuit to the corresponding common control circuit, by connecting the wires *a, c,* and *d* to said common control circuit through the make contacts *pa*5, *pa*3 and *pa*4.

Figure 2:
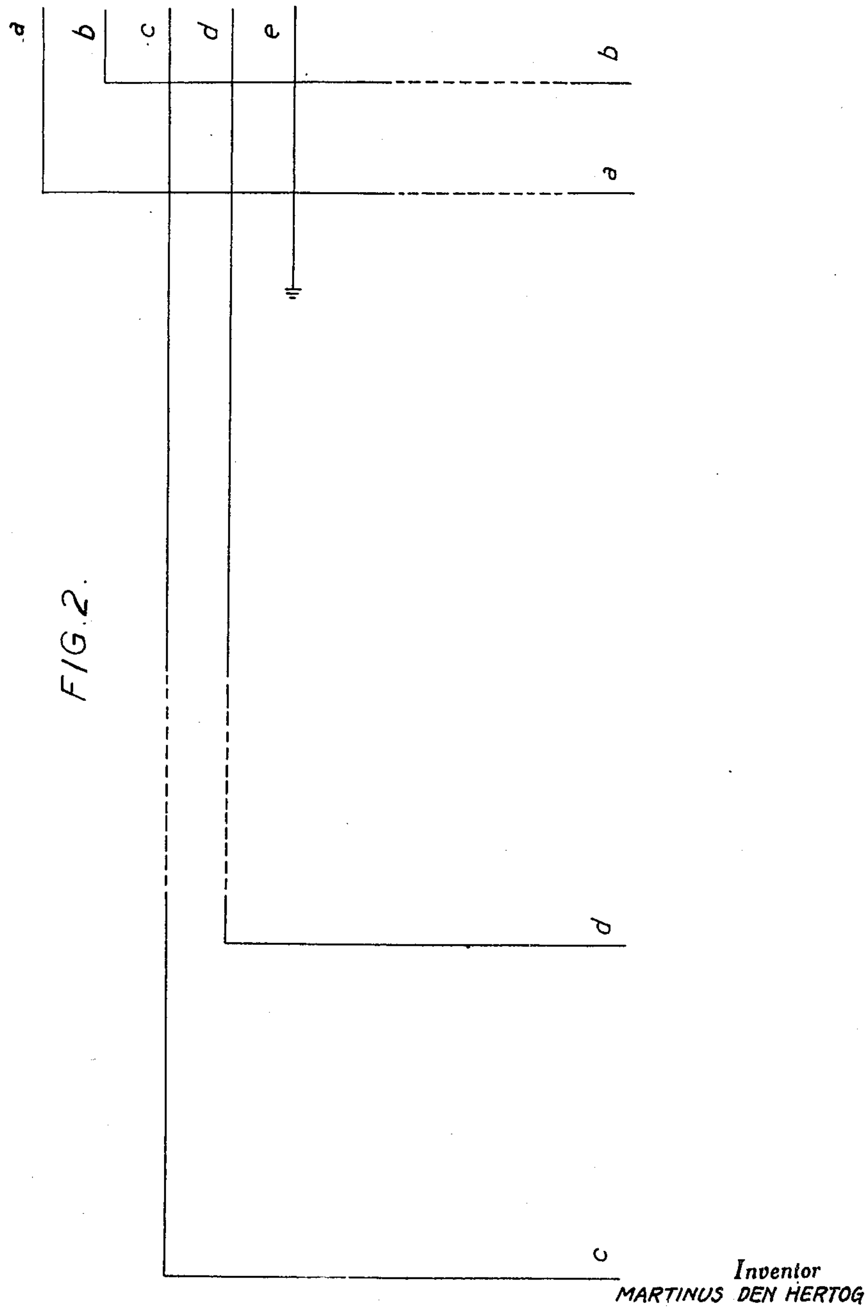
Fig. 2 shows the connections between the register and one group selector stage.

Moreover, relay PA prepares a holding circuit for itself through the wire *e*, in series with the winding of the horizontal magnet PHM and make contact *pa*2; said magnet cannot operate in the time unit concerned owing to the fact that an earth is directly applied to the two ends of its winding, the wire *e* in fact being directly connected to ground, as shown in Fig. 2.

The common control circuit is set in operative position, earth being sent in the said common control circuit through the following circuit: make contact *pa*1, back contact *phm*1, relay PB, battery. Relay PB of the common control circuit pulls up and, through its contact *pb*1, applies earth to the anodes of the cold cathode tubes P*va*1 . . . 6, P*vb*1 . . . 6, P*vc*; through its contact *pb*3, it connects the transformer PT1 belonging to the common control circuit to the individual selector circuits, and thus preparing the common control circuit for the selection of an outlet in the desired group.

A resistance R*g* of 100,000 ohms has been provided in the common control circuit for each of the outlets which can be reached through a group of selectors, this resistance being connected at one of its ends to the next selection stage through the wire *f'*.

The resistances R*g* are connected in multiple to two successive stages of rectifiers placed in series ARCS, BRCS and rectifiers in shunt ARCP, BRCP. The rectifiers in shunt ARCP, BRCP are connected to sources of current which will be described in the following paragraphs.

Figure 1:
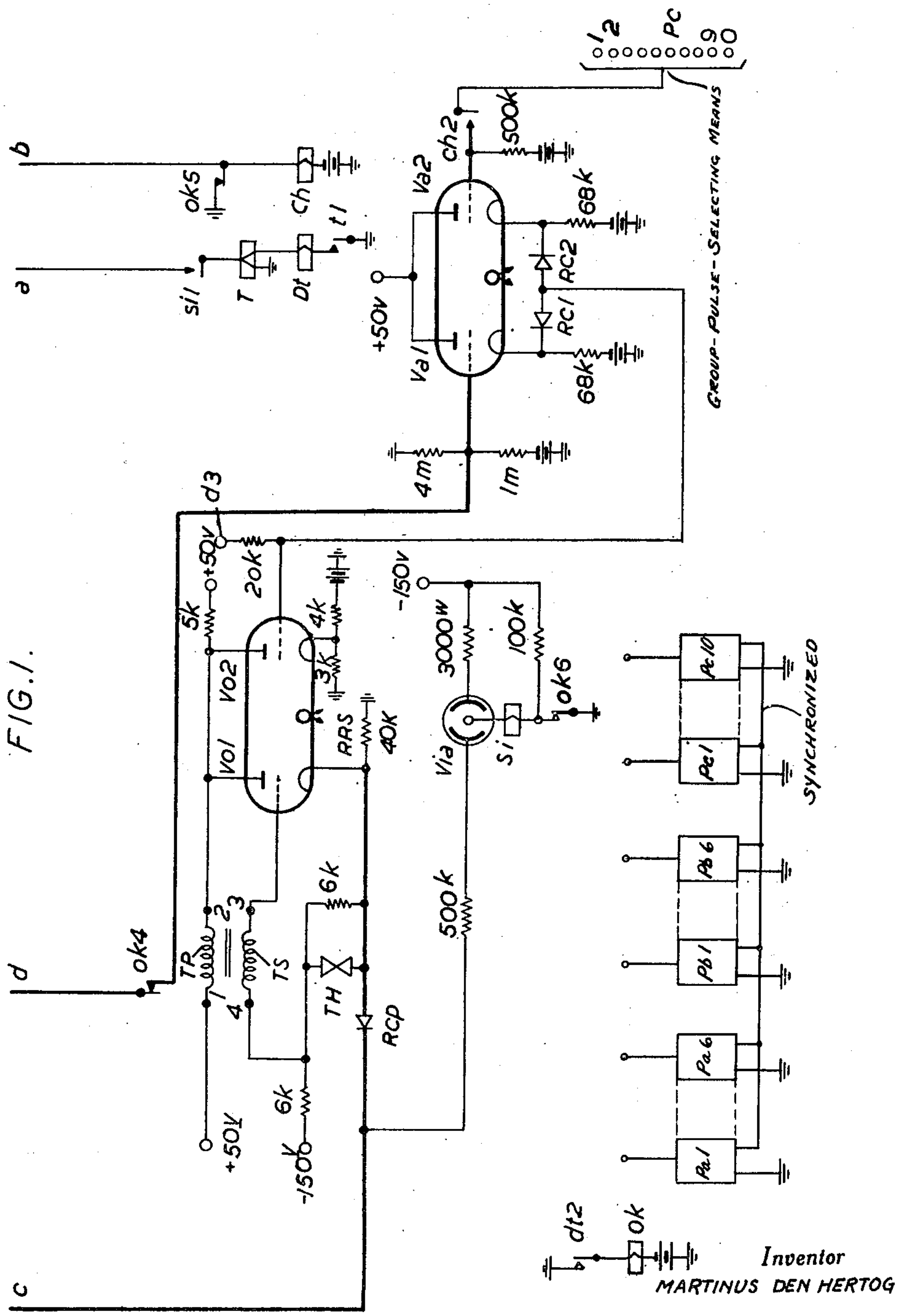
Fig. 1 shows the circuit elements of a register controller sufficient to describe and explain the operation of the group selector and of its common circuit.
Figure 5:
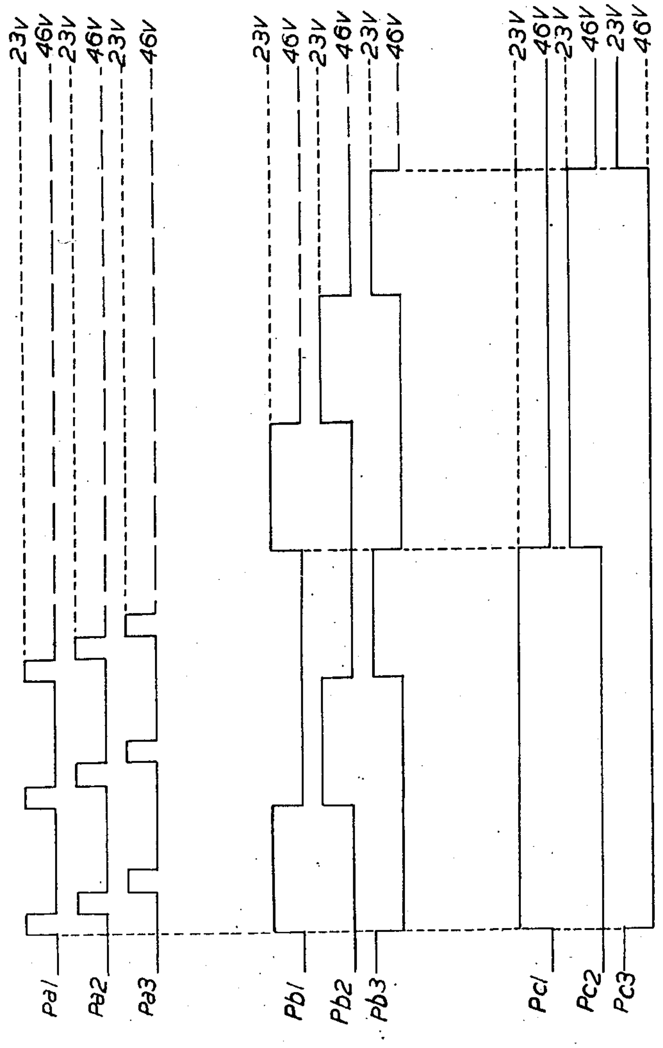
Fig. 5 shows a diagram of the cycles of impulses situated in time employed to control the selection.

Fig. 5 shows the curves of the impulses produced by the various sources shown in Fig. 1, said impulses being employed as time bases in order to obtain a code with (P*a*=6)×(P*b*=6)×(P*c*=for example 10)=360 units.

The group P$a$ comprises 6 sources each supplying an impulse during 6 successive time units in a periodic cycle. The length of each of these impulses corresponds to the duration of the time unit on which the whole system is based, and in the following will be taken as the unit of time.

The group P$b$ also comprises 6 sources each supplying an impulse during 6 successive time units in a periodic cycle. The length of each of these impulses corresponds to 6 positions in time of the impulses produced by the sources P$a$ and their period to 36 positions in time of the impulses of said sources.

The group P$c$, for example, comprises 10 sources of which the impulses correspond to 36 positions in time of the impulses produced by the sources P$a$ and the period to 360 positions in time. These 10 sources like those of the other groups produce impulses situated in time and staggered with respect to each other, so that the impulse produced by each of the sources comes after that of the preceding source.

The sources P$a$, P$b$ are used to control the transmission of a signal made up of one impulse situated in time, as also the detection of a signal made up in the same manner. The simultaneous use of any two sources of different types makes it possible to obtain 6×6=36 different signals situated in time. At the transmitting end, these 36 signals situated in time are used to explore outlets.

The sources P are normally at the potential of −46 v., but, at different moments, during the times of the impulses, this potential is brought to −23 v. The sources P controlling the rectifier gating circuit ARCP, ARCS, BRCP, BRCS are normally at −46 volts, this being their "no pulse" level, but at different moments each source assumes a potential of −23 volts, this being their "pulse" level. The gating circuit is a "tree circuit" with 36 resistances R$g$ each connected to a gate ARCS—ARCP, which gates are multipled in sixes to six gates BRCS, BRCP. The lead $f'$ which is connected to R$g$ is at −23 volts in time units which represent free outlets (see below) and at −46 volts in time units which represent busy outlets.

The potential representing a free outlet can only be effective at the grid of PAV when −23 volts is simultaneously applied by the pulse sources connected to the branch rectifiers ARCP and BRCP connected to the circuit between the resistance R$g$ concerned and the grid of PAV. Should the potential of either of these sources be at the "no pulse" or relatively negative level of −46 volts, current flows from the −23 volts (representing a free outlet) on the $f'$ lead through R$g$ and that branch rectifier ARCP or BRCP whose voltage is −46 volts. The relations between the resistances of R$g$ and the rectifiers is such that such current flow holds the connection from R$g$ to PAV at or near −46 volts.

Thus the −23 volts potential characterising a free outlet is only effective at the grid of PAV when −23 volts (i. e. "pulse" or relatively positive level) exists simultaneously on both branch rectifiers connected to the connection from the resistance R$g$ concerned to the grid of PAV. Hence branch rectifiers act as gates which can cause current flow to the grid of PAV to be prevented or permitted.

The shunt rectifiers thus act as current absorbing devices ("gates") which may open or close the circuit going to the tube PAV; it is only when this device ceases to absorb on account of the application of a potential of −23 v. by the associated sources that an operating voltage is applied to tube PAV. The result is, that it is only when all the gates controlling the circuit connecting the resistance R$g$ of a particular outlet to the tube PAV are blocked that the operating voltage is applied to the grid of the tube.

It will now be seen that the two sets of sources P$a$, P$b$ are connected to the gates in such a way that said systems pass the current in different time units for each of the outlets; when a circuit is free, it sends an impulse to the grid circuit of the tube PAV during a time unit which characterises its outlet. Each outlet of a primary selector is connected in the common control circuit to an individual gate ARCP, itself connected to one of the sources P$b$1. . . 6. Each of the successive groups of 6 outlets connected to the different sources P$b$1 . . . 6, 7 . . . 12, 13 . . . 18, etc. is associated with a second common stage of gate composed of the rectifier BRCP. Thus in all, there are 6 gates in the second stage which in turn are distributed in a single group. The gates BRCP in this group are respectively connected to the 6 sources P$a$1 . . . 6.

The result of this is that for each outlet an impulse from the wire $f'$ can only be sent to the grid circuit of PAV during one of the 36 time units which characterises the number of the outlet.

As it has been assumed that the switch comprises 34 outlets, only 34 time units are used and two groups of 6 sources are employed, as described above, to give these time units, two of the 36 time units not being used.

It will be seen that wire $f'$ is connected to the secondary switch associated with the outlet of the primary switch over the contact SA2 which will be opened if this secondary switch is busy or if it is not possible to employ it, and a back contact *sb*2 in the common control circuit of the secondary switch, Fig. 4, to the secondary winding of a transformer ST2. This transformer is connected in the anode circuit of an amplifier valve SAV2 of which the grid is connected through a resistance SAR to a common point SAP which is connected to all the outlets connected to the vertical wires of the secondary switches, there being a rectifier STRC individual to each outlet connecting SAP and the wire $f$ for that outlet. It may be assumed that the outlets of the secondary switches are connected to the incoming circuits of primary switches, such as shown in Fig. 3 in the next stage of selection, and it will be noted that an impulse (i. e. −23 volts) exists on the wire $f$ every time the corresponding primary switch is free. This potential is obtained from a source P$c$ which characterises the numerical group to which said outlet belongs.

The various outlets connected to a multiswitch of a secondary switch may belong to different numerical groups in the next selection stage, and owing to this it is obvious that potentials may be present on the common point going to the grid circuit of tube SAV2, in the common control circuit of the secondary switch, in different periods of time P$c$, in accordance with the free circuits which may be reached in the various numerical groups connected with the secondary switch. For example, assuming that a secondary switch gives access to certain outlets in numerical group No. 1, to others in numerical group No. 2 and to still others in numerical group No. 3, a potential of −23 v. will exist in the grid circuit of tube SAV2 of the secondary switch during all the time units P$c$1, 2, 3 which characterise groups No. 1, 2 and 3, provided that at least one circuit in each of these three groups is free and connected to said secondary switch. For example, in the case in which all the circuits of group No. 1 connected to the secondary switch are busy or cannot be reached, none of the circuits in this group will send a potential of −23 v. during the time units corresponding to this group and, consequently, during the whole of this period of time a potential of −46 v. would be present in the grid circuit of the tube SAV2 and the latter would not be conductive. During the two other periods of time, a potential of −23 v. would be connected as long as at least one of the circuits in the group concerned and connected to the secondary switch can be reached. It is clear from the foregoing that the potentials created in the secondary winding of transformer ST2 in the secondary switch will be at −23 v. during all the time periods P$c$ corresponding to the groups in which free circuits can be reached by the secondary switch, and will be at −46 v. during all the periods of time corresponding to groups which do not comprise free circuits which can be reached by the secondary switch.

In this way every wire $f'$ will be multipled to outlets in different numerical groups and, according to the condition of these outlets, impulses can be sent on each wire $f'$ during several periods of time P$c$. Impulses can be produced on more than one wire $f'$ during the same period of time P$c$. The primary switch does not need to differentiate between the numbers of the outlets in a particular numerical group of the secondary stage which are free; it is only necessary for it to know that at least one outlet in a numerical group of the secondary stage is free.

The time units P$c$ employed for marking numerical groups form a part of a recurrent cycle of impulses situated in time in which each impulse has a duration of 36 time units P$a$ or 6 time units P$b$.

Thus, a complete cycle P*b* is obtained during each impulse P*c*.

The coincident impulses P*c* coming from outlets in the same numerical group produced on the different wires *f'* are translated into successive impulses P*a* on the wire *d* leading to the register-controller, by means of the control equipment ARCS, ARCP; BRCS, BRCP. This produces successive impulses in such a way that, during each of the successive impulses P*c* corresponding to the successive numerical groups starting from the secondary switch, a certain number of impulses P*a* are applied to the wire *d* according to the number of free secondary switches, which are available to the primary selector concerned, and which in turn have free outlets in the corresponding numerical group. If $c=10$, impulses coming from certain of the 10 different series of impulses P*a*, each consisting of 36 impulses, will be returned through the wire *d*.

The position of one impulse P*a* in a cycle of 36 impulses identifies the secondary switch from which that impulse has been derived. The numerical group from which the impulse comes is indicated by the impulse P*c* during which it is produced. The impulses P*a* sent to the register are caused by the operation of the tube PAV, owing to the fact of the successive impulses arriving through the control equipment. Each time the tube PAV operates, it produces an impulse by means of transformer PT1 which is transmitted to the wire *d* through make contact *pb*3, back contact *phm*2, make contact *pa*4, back contact PHB2.

The impulses transmitted on the wire *d* are transmitted through back contact *ok*4, to the grid of thermionic tube V*a*1 (Fig. 1). The grid of V*a*1 is normally very negative, owing to the fact that the resistance inserted between earth and the grid is 4 megohms while the resistance inserted between the negative terminal of the 48 v. battery and the grid is only one megohm. Similarly, the grid of the twin tube V*a*2 is normally negative, a negative battery being connected permanently to said grid through 500,000 ohms. The device which registers the first digit in the register, transmits an impulse from the P*c* source corresponding to the value of that digit in the well known manner during one of the 10 time units of the cycle P*c* and hence during a period corresponding to 36 time units P*a* to the grid of tube V*a*2 through make contact *ch*2, in order to select the impulses corresponding to the secondary switches having free outlets in the corresponding group. Each impulse received on the grid of V*a*1 renders the tube conductive, and the cathode, which is normally negative, becomes positive by reason of the high resistance of the cathode circuit in relation to that of the anode-cathode space. Each time that an impulse P*c* is applied to the grid V*a*2, the tube becomes conductive and its cathode is brought to a positive potential.

When impulses are simultaneously applied to grids of the tubes V*a*1, V*a*2, by the primary group selector and by the source P*c* corresponding to the registered digit, the cathodes are simultaneously positive the rectifiers RC1 and RC2 are blocked, and render the grid of V*o*2 positive and cause the tube to conduct. This indicates that an impulse has been received from the primary group selector which has access to a free outlet in the required group.

Consequently, the tube V*o*2 causes the operation of the tube V*o*1. The tube V*o*1 forms a part of an impulse regenerator which also comprises a transformer TP, TS, connecting the anode and grid circuits, a resistance RRS and a varistor or thermistor TH in parallel on the grid bias and cathode circuits.

In the absence of a starting impulse, the grid of the generator tube V*o*1 is biassed to a value which does not permit the tube to operate, and no current flows either in the windings of transformer TP, TS, or in the tube. If a negative voltage is suddenly applied to the anode of the tube, (by the operation of tube V*o*2), current flows in the primary TP and induces a voltage across the secondary TS, thus applying a positive potential to the grid of tube V*o*1. If the amplitude of the voltage applied is sufficient to bring the grid potential to a suitable value, taking into consideration the grid polarisation, the generator is fired. The anode current begins to flow through the anode winding TP; the grid then becomes more positive and in turn causes the increase of the anode current. Almost immediately the grid becomes more positive than the cathode; a considerable grid current begins to flow, thus restricting any subsequent rise in the grid potential. At this moment, the anode current and the grid current begin to decrease, the latter decreasing more rapidly, so that the difference between the ampere turns of the anode and grid windings rapidly increases.

After a period of time which to a great extent depends on the self-inductance of the windings of the transformer and of the resistance of the anode circuit of the tube, the grid current is cancelled. From this moment any reduction in the anode current causes the appearance of a negative potential in the grid winding which in turn causes another reduction in the anode current. The tube is then rapidly cut off, and ceases to operate until a fresh starting impulse arrives.

A current impulse of substantially rectangular shape is thus produced in the cathode circuit, of which the amplitude and duration are not dependent either on the amplitude or the shape of the starting impulse.

The loading resistance RRS placed in the cathode circuit of the generator makes it possible to transform the current impulse into a potential impulse, said potential being maintained substantially at the same value for the whole period of the impulse.

An impulse will be produced for each starting impulse applied to the anode, after which the tube returns to normal. The voltage impulse produced on the terminals of the cathode loading resistance of V*o*1 is applied to the group selector through the rectifier R*cp* and the wire *c*.

The impulse transmitted on the wire *c* causes the firing of the cold cathode tube V*ia*, of which the cathode is at the potential of −150 v.; the relay S*i* is energised through the following circuit; cathode and anode of V*ia*, relay S*i*, back contact *ok*6, earth.

Owing to the closing of contact *si*1, the test relay T is connected to wire *a*.

The impulse retransmitted by the register on the wire *c* to the common control circuit is sent through the group selector in the following circuit: wire *c*, back contact PHB1, make contact *pa*3. The impulse is received on several cold cathode tubes P*va*1 . . . 6, P*vb*1 . . . 6, P*vc* . . . placed in the common control circuit.

The 12 tubes P*va*, P*vb* are each controlled by an individual rectifier connected to one of the impulse sources P*a*, P*b*, said tubes being ionizable only in time units determined by these impulse sources. Thus the tube P*va*1 is controlled by the impulse source P*a*1, the tube P*va*2, by the source P*a*2, and so on, so that a tube, such as P*va*1, can only be ionised during one of the time units in which the source P*a*1 is transmitting an impulse. that is to say, in the time units 1, 7, 13, etc.

Similarly, the tubes P*vb*1 . . . 6 are each connected to one of the sources P*b*1 . . . 6 through a rectifier, so that a tube, such as P*vb*1, for example, can only be ionised during one of the groups of time units in which the source P*b*1 transmits one impulse, that is to say, in the time units 1 . . . 6, 37 . . . 42, 73 . . . 78 etc.

Finally, there is in addition a final tube P*vc* which is not controlled by rectifiers, and which therefore can be ionised when it receives an impulse in any time unit whatsoever arriving from the register through the wire *c*.

As a result of the foregoing an impulse arriving in any time unit always causes the ionisation of one tube of each of the two groups P*va*, P*vb*, in the same way as that of the tube P*vc*, so that a combination of tubes, each taken from one group characterises each of the 36 time units.

In the case for example of an impulse coming from outlet No. 25 in group No. 5, this impulse is received at the moment in which only the sources P*a*1, P*b*5 are transmitting an impulse, the tubes P*va*1, P*vb*5 are ionised and cause the operation relays PLA, POE inserted in the anode circuits.

The operation of the tube P*vc* changes the potential conditions of the anode circuit, so as to remove the block from a rectifier connected between the anode circuit of tube PVC and the grid of the tube PAV, so that subsequent impulses cannot actuate PAV and consequently other impulses are no longer transmitted. Moreover, the impulse arriving from the wire *c* is transmitted, through a transformer PT2 in the common control circuit of the primary switch, to a system of gates and impulse sources in order to prevent further transmission of the identifying impulses over the wire *f'*.

The conductor coming from the secondary of the transformer PT2 is multiplied on 6 conductors, each comprising an individual rectifier FRCS. Each conductor is connected on the other side of the rectifier to an impulse gate comprising a rectifier FRCP, the 6 gates being respectively connected to the 6 impulse sources P*a*. Each of the 6 conductors is in turn multiplied on 6 conductors *g*, each comprising an individual rectifier SRCS and being connected to a corresponding impulse gate, comprising a rectifier SRCP to which is applied one of the impulses P*b*1–6. In this way, the impulses arriving through the wire *c* during 36 different time units P*a* are distributed on the 36 wires *g'*. Each wire *g'* is connected to the common circuit of the secondary switch connected to the outlet of the primary switch which is tested during the corresponding time unit. In this way, a wire *g'* is obtained which is peculiar to each of the outlets of the primary switches. This gating network is the reverse of the network controlling PAV, i. e. it is a distributor. Normally the —23 volts connected to the junction between rectifiers PRC and SRCS for each *g'* lead flows via SRCS, FRCS and PT2 to the —46 v. point. The branch rectifiers are sequentially blocked, i. e. biassed by the "pulse" level voltage of their controlling sources, and when a pulse occurs, the pulse of —23 v. produced in the secondary winding of PT2 blocks all FRCS rectifiers. However, this is only effective in one path through the network, as the timed pulses only block both branch rectifiers for one path through the network at each interval. Hence the selected impulse is distributed to the *g'* wire appropriate thereto.

The wires *g'* associated with the secondary switches in the same multiswitch are connected together in multiple as also to the primary of a transformer ST3.

An impulse arriving on transformer ST3 causes the ionization of a cold cathode tube S*vd* placed in the common control circuit of the secondary switch and this acts on the grid circuit of tube SAV2 in a similar manner to the action of tube PVC of Fig. 3 and the grid of tube PAV and prevents the transmission of other impulses.

First of all I will explain how the system of gates and impulse sources associated with the transformer PT2 in the primary switch operates so as to transmit an impulse to one particular outlet.

It is obvious that by using the same sources for the gates controlling the operation of the tube PAV, Fig. 3, and for the tubes associated with the transformer PT2, Fig. 3, an impulse transmitted by the tube PAV identifying a particular outlet and returned by the register to the transformer PT2, Fig. 3, will produce an impulse of —23 v. on the wire *g'* of the same outlet, because each of the sources P*a* and P*b* connected through the gates FRCP and SRCP to the wire *g'* of this particular outlet will at this moment be at a potential of —23 v. For each of the other outlets the wire *g'* will be maintained at —46 v. because at least one of the sources P*a* and P*b* connected to these outlets will be at —46 v.

The tube S*vd* operates in a circuit passing through the relay SE, back contact *sb*4, make contact *sd*1. The relay SD is normally attracted through back contact *se*1, but its circuit will now be interrupted at *se*1; nevertheless, on account of its slow release, it remains attracted until the relay SB is attracted as described hereunder and completes at *sb*6 a holding circuit for relay SD.

The pulse on the *c* wire from the register is applied to tubes S*va*1–6, S*vb*1–6 and S*vc*, which are arranged in the same manner as tubes P*va*1–6, P*vb*1–6 and P*vc* of the primary selectors. Hence one S*va* tube, one S*vb* tube and S*vc* tube are fired in response to the impulse.

The make contacts (indicated, but not fully shown, in Fig. 4) of the two anode relays associated with the tubes S*va*1 . . . 6 and S*vb*1 . . . 6, which were operated, close circuits which characterise the outlet to which the primary group selector, seized by the call, has to be connected.

The group selector circuits have been provided for use with a multiswitch which has the following characteristics:

The switch comprises a certain number of horizontal bars, each of which may be regarded as representing an individual switch, capable of handling a call like a single movement switch of a well known type. 34 outlets have been provided accessible to all the individual switches and common to said switches.

When a vertical bar and horizontal bar have operated successively, a certain number of contacts placed at the points of intersection of these bars are closed, the individual switch being connected through said contacts to the circuit concerned. In the selector switch shown (Fig. 3) these contacts are 5 in number, the 5 contacts placed on one of said intersection points being designated by A', B', C', D', and E'. To the right of these contacts are shown connections which terminate in the outlet which can be reached through the vertical wire groups concerned; on the left of these contacts, are shown the connections associated with the individual switch.

Each vertical bar is associated with an individual operating magnet PVM, the energisation of said magnet actuating the bar upwards. One horizontal bar is provided for each of the *x* individual switches making up the multiswitch; there is an individual horizontal magnet PHM for each switch. The operation of an individual horizontal magnet actuates the corresponding horizontal bar.

The contacts of each of the relays PL, that is to say, *pla*1 . . . *plf*1 (indicated, but not fully shown, in Fig. 3) are each multipled on a corresponding group of six contacts comprising one contact of each of the relays POA . . . POF, that is to say, *poa*1 . . . *poa*6 . . . *pof*6. 34 of these 36 contacts *poa* . . . *pof* are connected to the corresponding magnets PVM1 . . . 34.

Firstly, the circuit of one of the 34 vertical magnets PVM of the multiswitch is completed. For outlet No. 25, for example, this circuit is as follows: make contacts *pla*1, *poe*1, magnet PVM25; for outlet No. 34 for example, this circuit is as follows: make contact *pld*1, *pof*6 magnet PVM34. Vertical magnet PVM which has been energized actuates the associated vertical bar upwards.

The vertical bar closes contact PVB1 which is connected in series with the test circuit in which the winding of the relay P*c* (Fig. 3), is inserted. The register has caused the connection of test relay T through make contact *si*1 to the wire *a*. Relay T is then energised through the following circuit; earth, high resistance winding of relay T, make contact *si*1, wire *a*, back contact PHB3 in the primary group selector, make contact *pa*5, relay PC, in the common control circuit, which is energised, make contact PVB1, associated with the vertical bar of the selected circuit, wire *a'* to the secondary selector (Fig. 4), back contact SHB3, back contact *sa*5, to battery through a 240 ohm resistance.. The closing of contact *t*1 (Fig. 1) completes the double test circuit through the relays D*t* and T in accordance with a well known method, and, provided that the outlet concerned has only been selected by the call concerned, the relay D*t* also operates. The closing of contact *dt*2 causes the energisation of relay O*k*, shown in the lower left corner of Fig. 1. Relay S*i* is released on account of the opening of contact *ok*6. Earth is cut off on the wire *b* on account of the opening of contact *ok*5, so that relay PA of the primary selector can be held through magnet PHM, contact *pa*2 and earth applied to the incoming *e* wire.

As soon as magnet PHM has operated, it opens its back contact *phm*3, thus eliminating the earth on the wire *b* of the selector. Relay C*h* has remained momentarily operated, after the elimination of earth on the wire *b* at *ok*5, through the earth from the selector through the following circuit; wire *e* in the cord circuit through *pa*2, magnet PHM of the selector and contact *phm*3, wire *b*, but it is now released.

The opening of contact *ch*2 temporarily disconnects impulse source P*c* from tube V*a*2. The opening of contact *si*1 causes the release of relays T and D*t*. The release of relay D*t* releases relay OK and the release of relay OK causes the reoperation of relay C*h*. The latter again connects the P*c* impulses to the grid of tube V*a*2.

The opening of contact *phm*1, Fig. 3, causes the release of relay PB, which in turn releases the relays actuated in groups PL and PO. Vertical magnet PVM is temporarily held in operative position through the make contact *pvm*1 and make contact *pc*1.

Magnet PHM actuates the horizontal bar of the individual primary selector and the 5 contacts A' . . . E' connected to the desired circuit are closed.

Contacts PHB1 . . . 3 associated with the horizontal bar completely isolate the individual circuit of said primary selector from the corresponding common control circuit. Relay PC releases and causes the return to normal of the vertical magnet. Wire *b* is again earthed through back contact $ok5$ in order to energise relay SA in the secondary selector circuit, Fig. 4, which has been seized.

This puts the primary group selector in the condition required for conversation and at the same time disconnects it from the corresponding common control circuit.

When relay SA is pulled up, it fulfills the same function as relay PA, Fig. 3, that is to say, it disconnects the impulse potential from the wire $f'$ at SA2. Moreover, contacts $sa1$ applies earth through back contact SHB5 to actuate relay SB in the common control circuit. Through the make contacts $sa3$, 4, 5, the relay SA connects the selector circuit to the common control circuit.

The register causes the continuation of the selection operations by the secondary switch. The impulses P$c$ coming from the outgoing wires $f$ (Fig. 4) are sent through gates controlled by impulse cycles P$a$, P$b$, similar to those shown in Fig. 3, to the grid circuit of the tube SAV1. The impulses P$a$ are transmitted through the gates, tube SAV1, transformer ST1, make contact $sb3$, make contact $sa4$, back contact SHB2, to the wire $d'$ terminating in the register.

In the meantime, on account of the operation of the relay SB, earth is removed from the anode of tube S$vd$ on back contact $sb4$, causing said tube to be extinguished.

Tube SAV2 nevertheless cannot transmit impulses as long as SB is attracted owing to the fact that the secondary winding of transformer ST2 is held open on contact $sh2$. When an impulse is received in the register through wire $d$ and during the suitable period P$c$, the tubes V$a1$, V$a2$, simultaneously have positive potentials on their cathode resistances, as previously described, and tubes V$o1$, V$o2$, are actuated, so as to generate an impulse on the wire $c$. This impulse causes the operation of tube V$ia$ as before, with its associated relay S$i$, and, through wire $c$, a combination of the tubes S$va$, S$vb$, Fig. 4, as also S$vc$. The attraction of a combination of relays SL and SO which results from the operation of these tubes causes the attraction of corresponding vertical magnet SVM by a combination of the make contacts $sla1$ . . . $slf1$ and $soa1$ . . . 6. The test circuit is completed from the outgoing wire $a$ through make contact SVB1 of the vertical bar, relay SC, make contact $sa5$, back contact SHB3 and wire $a'$ connected to test relay T in the register.

As before, relays T, D$t$, O$k$ in the register are energised one after the other and earth is removed from the wire $b'$ by the register, so that horizontal magnet SHM is no longer short-circuited and is attracted by the earth on contact $e'$, Fig. 3, in series with relay SA which is held in this circuit. The horizontal bar is actuated and opens its contacts SHB1 . . . 5, causing the release of the common control circuit in such a way that relays SB, SC release, after which the relays SL, SO and the vertical magnet previously actuated are also released. By means of back contacts $sb2$ the secondary winding of transformer ST2 is reconnected to the wires $f'$, so that the circuits in the multiswitch which remain free can again supply test potentials to the preceding primary switches in the particular P$c$ time unit.

The requisite conditions for the interconnection of the various switches included in the two stage selectors and for the interconnection of the two stage selectors with other stages of selection will now be considered.

*Rule 1.*—It is preferable for each outlet from a "double-selection" stage to be connected to the vertical wires of a single multiswitch belonging to the switching stage. The reason for this necessity is the following. First of all, let us assume that an individual selector belonging to a multiswitch located in the next switching stage is connected to the vertical wires of two different multiswitches belonging to secondary multiswitches situated in the preceding switching stage and that this primary selector is the only one of its group which can be reached at a particular moment by the secondary switches to which it is connected. In this case the selector situated in the next switching stage supplies its characteristic test potential to two different common control circuits corresponding to the two secondary multiswitches to which it is connected, and in this way this potential is transmitted to all the free primary selectors having access to one or both secondary multiswitches. It may now happen that in two primary selectors the outlets are free and that they are tested at the same moment owing to the fact that they have the same serial number, and that each is given access to one of the two previously mentioned secondary multiswitches. The two primary selectors will test this outlet exactly at the same moment because both find a test potential which is finally supplied by the same switch in the switching stage which follows the secondary selectors. Owing to the fact that the two primary selectors during their test, will test individual selectors which are associated with the different secondary multiswitches, they will effect their "double test" by means of the continuous test potential coming from the two common control circuits of the secondary switches concerned; and, consequently, there is no possibility of checking, by means of a direct current "double test" that the two primary selectors have really checked the free condition of the same outlet coming from the different secondary switches and leading to the same switch in the next stage. Consequently, the two switches will be connected to the next selection stage and then the two secondary switches will both try to employ an outlet leading to the only switch in the next stage which is assumed to be free in the desired group and which is accessible through the secondary switches concerned. One of these secondary switches will of course fail in its attempt and the corresponding communication will be delayed. This might, however, not be necessary because the primary switch concerned might have selected an outlet leading to a different switch in which the outlets belonging to the desired group were still free. In order to prevent this useless delay it has been decided that the outlets cannot be connected to more than one secondary switch, thereby obviously preventing the possibility described above.

*Rule 2.*—The different individual switches belonging to a primary multiswitch PS may be connected to the vertical wires of the preceding multiswitches having any serial number whatsoever: similarly, they may be connected to the vertical wires of different multiswitches situated in the preceding stage of selection having an equal serial number, provided that rule one is satisfied.

The significance of this rule is that the primary switches in a multiswitch can be connected in preceding switches to vertical wires having the same serial number, which means that they can be tested at the same moment. It will be noted that the vertical wires having the same serial numbers in different multiswitches will always be tested exactly at the same moment, because the test moment for each vertical wire is determined by the time unit which characterises this vertical wire and which is the same for vertical wires having the same serial number in different multiswitches. The connection of primary switches to vertical wires having the same serial number in the preceding switches offers no disadvantages, so that they can be tested in a totally simultaneous manner, because the primary switches are arranged in such a way that different calls can be handled simultaneously.

*Rule 3.*—Each individual switch in a secondary multiswitch SS may be connected to one of the vertical wires belonging to more than one multiswitch PS associated with the same stage of selection. It will normally be connected to a vertical wire of a multiswitch PS.

The reason that the primary selectors cannot be connected to more than one multiswitch comprising secondary selectors and situated in the preceding selection stage, as explained for rule 1, no longer exists when it is a question of secondary selectors with more than one primary selector in the same switching stage.

This can be explained as follows:

Assuming that an individual secondary selector is connected to two multiswitches comprising primary switches and that it is also connected to vertical wires in these two multi-switches having equal serial numbers, it is then possible for the secondary selector to be tested simultaneously by primary selectors in two different multiswitches for two different calls. In this case there is no danger of a "double test," because after the two selectors have found the free secondary selector they will introduce the "double test," device by checking the direct current potential which is supplied by the secondary selector and only one of the primary selectors will be able to reach the secondary selector. The primary selector having failed will now continue to hunt in the usual way owing to the fact that its relay PC cannot be maintained attracted, so that the cold cathode tubes will be deionised and the vertical magnets will be released. Consequently it is not possible in this case to obtain a premature connection through a primary switch unless there is a possibility of finding a free outlet.

*Rule 4.*—The various individual switches belonging to a secondary multiswitch SS may be distributed in any manner whatsoever among the different primary multiswitches associated with the same switching stage, provided that they are connected to vertical wires having different serial numbers in one or more primary multiswitches PS. This is essential for the type of system described.

The necessity for this requirement may be explained as follows:

It will first of all be assumed that in a particular multiswitch comprising secondary selectors there are two or more individual selectors which are free, but that this multiswitch only gives access to a single free outlet in a certain group. Owing to this, it may happen that two individual selectors in the secondary switch are connected to vertical wires belonging to different multiswitches comprising primary switches and that a path of access is sought through two different primary multiswitches to an outlet belonging to the particular group in which there is only one circuit available, and moreover, that this is done through the two secondary switches concerned. If now two secondary switches are connected to vertical wires having the same serial number in the two different primary switches, their outlets will be tested in an absolutely simultaneous manner because the two primary switches will find a free outlet which is available in the required group, and this outlet is tested at the same moment because the secondary switches concerned are connected to vertical wires having the same serial number. When the two primary switches have checked the free outlet they will make a direct current check, but owing to the fact that they have seized two different individual switches in the same secondary multiswitch they will, consequently, both find a free test potential. Consequently it is again impossible to ascertain whether a single outlet has been tested by two calls, by means of a direct current test. In order to overcome this drawback it has been decided that the individual selectors belonging to a secondary multi-switch will always be connected to vertical wires belonging to the preceding primary switches having different serial numbers. Consequently, two individual selectors in a secondary multiswitch can never be tested simultaneously and in the case considered above, one of the two will be tested before the other can be tested. However, as soon as one of the two has been tested, the tube S*vd* in the common control circuit of the secondary switch is ionised and disconnects the amplifier tube SAV2, so that other primary switches are prevented from testing any other individual selectors in the same secondary multiswitch. The result is that the second call must find a different secondary multiswitch through which a free outlet belonging to the desired group is still available.

*Rule 5.*—If an individual switch belonging to a secondary multiswitch SS is connected to vertical wires belonging to more than one multiswitch PS, the latter may be vertical wires having the same or different serial numbers, provided that these serial numbers are not used in connection with other individual switches in the same multiswitch SS, so as to satisfy rule 4. This rule is a logical consequence of rules 3 and 4 and it is unnecessary to explain it in more detail. It should nevertheless be noted that if the individual secondary switches are connected to more than one multiswitch comprising primary selectors, it is well to connect them to vertical wires having equal serial numbers. In this way a secondary switch will always be checked during the same time unit, even if it is connected to different primary switches and the number of time units available may all be employed for different individual switches in the same secondary multiswitch, so that the number of individual switches in the secondary multiswitch may be maximum and equal to the number of vertical wires available in a primary switch.

It follows from rule 4 that the number of individual switches in a secondary multiswitch SS cannot exceed the number of vertical wires provided in each primary multiswitch.

As each individual selector in a secondary multiswitch must be tested in a different time unit, it is a logical consequence of rule 4 that there cannot be more of these selectors in a multiswitch than there are time units available and that the number of these time units available is equal to the number of vertical wires provided in the primary switches.

The system proposed makes it possible to obtain very high selection capacities with selectors of low capacity by means of a special arrangement called "double selection."

Figure 6:
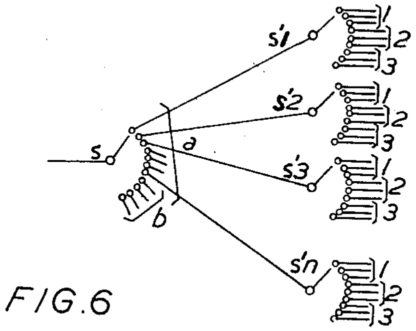
Fig. 6 shows a schematic representation of the primary and secondary switches with wipers of one selection stage.

We will now consider the assembly shown in Fig. 6.

The selector S serves one or more groups of lines such as *a* and *b*; each of the lines of the group *a* is connected to a selector S′. The selectors S′ are divided up into sections, each of these sections serving several groups of lines, three of these groups being shown.

The case of a selector S having access to a series of groups *a, b,* will be considered first of all.

Through the first line of the group *a* and selector $S'_1$, the selector S has access to three lines of the group No. 1, three lines of group No. 2, three lines of group No. 3. Through the second line of group *a* and selector $S'_2$, the selector S has access to three other lines in each of the groups 1, 2, 3, and so on until the *n*th and last line of this group. By these means, selector S has access to 3*n* lines of each of the groups 1, 2, 3.

It will be assumed for example, that the selectors S and S′ each have 50 outlets, that these outlets are divided into two groups of 25 on the selector S and into five groups of 10 on the selector S′. The selector S will thus have access in each of these two groups to 25 selectors S′ each having access to 10 different lines in each of the five groups, so that the selector S has access to $25\times10=250$ lines in each of the 10 groups obtained.

Instead of separating the secondary switches S′ into separate groups, each associated with one of the groups coming from the selectors S, secondary switches S′ can constitute a single group which operates from a single group of outlets coming from S. In this case, the outlets of each section of secondary switches S′ may comprise outlets in each of the numerical groups of lines to which the whole of the "double selection" stage must give access.

In this case also by means of a simple calculation, it is possible to verify that the number of outlets accessible in each of the 10 groups may become equal to 250, if S and S′ have 50 outlets and if there are 10 numerical groups of lines of the same size.

Thus, there are 50 outlets coming from the switch S each leading to a different section of selectors S′ each of which in turn gives access to $50\div10=5$ outlets per group, and which are different for each section. The total number accessible through the 50 outlets coming from S is consequently $50\times5=250$.

It is in effect preferable not to divide the outlets coming from selectors S into several groups because in this way the number of switches S′ would be increased, since their traffic capacity decreases when they are used from a smaller group.

By means of certain arrangements which will be studied hereafter, the 250 lines to which the selector S has access in each of the 10 outgoing groups may be assimilated to a quasi-perfect group of 250 lines. Thus, the assembly of selectors S—S′, may be considered as substantially equivalent to one selector with 10 levels each of 250 lines.

Figure 7:
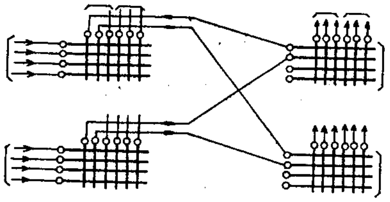
Fig. 7 shows a schematic representation of the primary and secondary cross-bar switches constituting one stage of selection.

In fact, each selector S′ is not at the sole disposal of a selector S, but is multipled on the outlets of several selectors S. Similarly, each selector S′ has outlets in common with other selectors S′ connected to other selectors S not multipled with the preceding selector S. The number of selectors S multipled together depends upon the traffic which may be handled by the selectors S′ forming the group *a* (or *b*) of Fig. 6. The selectors S are thus divided up into "sections," as shown in Fig. 7.

The number of selectors S′ multipled together depends upon the total number of lines necessary and upon the number of lines to which they have access in each group. The connections between selectors S and S′ are arranged so that in each section of selectors S, the outgoing lines are distributed over the greatest possible number of sections of selectors S′.

In order, with such an assembly, to obtain the equivalent of selectors with *m* levels of $n\times p$ outlets (*m* is the product of the number *x* of outgoing groups of the selector S by the number *y* of outgoing groups of the selector S′; *n* is the number of outgoing lines of each of the *x* groups of the selector S; *p* is the number of outgoing lines of each of the $y$ groups of selector $S'$); an arrangement is provided which makes it possible for the selector S to "see" through the selector S' the state of congestion of the desired outgoing group of S'; in other words, it is arranged so that the selector S cannot take the same free selector S', if the latter does not have access to any free line in the desired group.

It will be noted that in the case in which the circuits coming from the primary switches S form a single group, that is to say when $x=1$, the same reasoning applies and it is again preferable for the reasons given above.

It has been seen that the seizure of a line in a group selector was affected if the characteristic of condition (availability) and the group characteristic (number of the desired group) were simultaneously present. In order to obtain the desired effect, described above, each selector S', when it is free, supplies to the selectors S a certain number of conditions, each indicating a characteristic of condition, that is to say, combining condition of availability and group characteristic, for each of the groups of outlets to which this selector S' has access. If one or more of these groups no longer have any lines available, the corresponding characteristic information is no longer given to selector S. Thus, by controlling the routing of selector S by the group characteristic which is sought on the output of S', such a selector S cannot seize any selector S' which has no free lines towards the desired group.

We will consider Fig. 8, which shows the scanning device of the common control circuit of the selector S (primary selector) and the device for producing characteristic group impulses, which device is placed in the common control circuit of the selector S' (secondary selector).

In the left hand portion of this figure, the scanning device of the primary selector is, identically, the scanning device of the group selector, Fig. 3, the operation of which has previously been described. However, the resistance R*g*, over which the characteristic group impulse is supplied, is not directly connected to the corresponding source P*c*, but, through the line $f'$, it is connected to a point E of the common control circuit of the corresponding secondary selector. In a primary selector with 50 outlets, for example, each of the 50 resistances R*g* is thus connected to the point E of the common control circuit of the corresponding secondary selector. Thus, there are as many points E connected to the resistances R*g* of the "primary" common control circuit concerned as there are common control circuits employed for controlling secondary selectors connected to the outlets of the primary selectors forming a part of the multiswitch associated with the common control circuit shown on the left hand side of the diagram.

The group impulses necessary for the routing of the primary selectors will be sent through these points E. These impulses are produced in the following manner: each of the test wires $f$ of the outgoing lines of the secondary selectors is connected to a decoupling rectifier SIRC. All the rectifiers SIRC, which correspond to lines of the same group, are connected together through a point SAP with resistance SAR of 100,000 ohms. Thus, there are as many resistances SAR as there are groups of outgoing lines of the secondary selectors served by the common control circuit concerned. Each of these resistances SAR is also connected through rectifier Q*c* to the impulse source P*c* characteristic of the corresponding group and to a single point C' through a decoupling rectifier S*d*. Point C' is connected to the grid of an amplifier tube SAV2. Owing to the presence of the resistance system SAR, rectifier Q*c* and generator P*c*, the point C' is brought to a potential of about −23 v., every time that the impulse source gives −23 v. and the test contact $y$ is earthed, that is to say, during the time which corresponds to the impulse P*c*, if at least one line of the corresponding group is free, that is to say, at least one contact $y$ earthed in this group. If there is no free line in the group, the point C' is maintained at −46 v. It will be seen that instead of employing the impulse P*c* for the corresponding group as a free test potential for an outlet, as on the wire $f$, Fig. 3, an earth potential and a battery potential are employed at $y$ for the free and busy conditions, and the earth potential is translated by an impulse to the gate Q*c*, P*c*.

This process is repeated for each of the groups in the time unit in which the impulse P*c* which characterises it is transmitted. Thus, the point E is, by means of a transformer ST2, brought to the potential of about −23 v. during the time in which the various impulses are produced which characterise the line groups served by the secondary selector, provided that said groups have at least one free line.

Fig. 9 shows the diagram of the potentials on the point E, assuming that the secondary selector serves the groups 1, 2, 3, 4, 5, and no longer has any free lines available in the groups 2 and 5.

The potential of the point E conditions the seizure of the outgoing lines of the primary selectors which terminate on the secondary selectors associated with the common control circuit concerned. The scanning device of the common control circuit of the primary selector will not send impulses to the register when the line $f'$ is at −46 v., that is to say, if there are no longer any free lines in the desired group, even if the secondary selector serving said lines in free, and such a secondary selector cannot be seized by the primary selector.

The various secondary selectors served by the same common control circuit are generally connected to primary selectors served by different common control circuits. When a group of outgoing lines of said secondary selectors does not comprise more than a single free line, it is necessary for the whole of the secondary selectors which are still free to be immediately blocked as soon as a call to this group is made. If this were not the case, another primary selector might seize a secondary selector in the same section before the secondary selector seized by the first selector had had time to engage the only free line and the corresponding call could not be completed for lack of lines.

The device shown in the lower portion of Fig. 8 overcomes this difficulty.

When the register (having established the free state of a secondary selector having access to a group of lines which is not entirely engaged) sends an impulse on the wire C, as described for Figs. 3 and 4, the latter causes in the common control circuit on the primary selector the firing of certain of the tubes P*va*, P*vb* and the energisation of the cofintrol relays PL, PO of the corresponding vertical selection bar. The tube P*vc* is also fired to block the scanning device of the primary selector through the wire K and thus to prevent the transmission of other impulses to the register. This impulse received on the wire $c$ is also received on the transformer PT2 which immediately sends an impulse to the point M.

Each of the secondary selectors connected to the primary selector occupies a particular position on the scanning device of the primary common control circuit ARCS, ARCP, BRCS, BRCP, and the point M is connected to a scanning device made up of rectifiers such as FRCS, FRCP, SRCS, SRSP. The impulse sources P*a*, P*b*, are connected to the scanning device in such a way that the position of each of the inputs connected to the point M is that of one of the secondary selectors on the scanning device of the primary selector. Thus, the impulse sent by the transformer PT2, which is located in a time unit which characterises the position of the secondary selector seized, is transmitted to the point O of the common control circuit which serves said secondary selector and not to the other common control circuits serving other sections of secondary selectors.

The output O of the scanning device is connected through a transformer ST3 to a gas tube S*vd*, and the appearance of an impulse at the point O has the effect of causing the operation of the tube S*vd* which modifies the potential of the line K' which is connected to the input C' of the triode SAV2, generating group impulses for the primary selectors. In accordance with a well known method, the line K' acts on the tube SAV2 in such a way that said tube is blocked and no characteristic group impulse can any longer be sent to the primary selectors.

The common control circuit of the secondary selector then proceeds to hunt for an outgoing line under the conditions indicated for the primary selector, and as soon as this hunting is effected, the tube S*vd* is restored to its original position. Tube SAV2 is then unblocked and the group impulses again arrive on the common control circuits of the primary selectors.

It should be noted that the outputs of the primary selectors are not necessarily all connected to secondary selectors; they may also have access directly to other lines or selectors. In such a case the corresponding outputs of the scanning device are directly connected through resistances $Rg$ to the characteristic impulse source $Pc$ of the line group directly reached.

It should be possible to employ one tube $Svd$ for each group with gates directing the impulses through PRC to the corresponding tubes. The wires K′ would then be connected to the wires of the corresponding groups adjacent to the connection $Pc$, $Qc$ instead of merely wire K′ to the point C′.

One two-stage selection stage comprises a group of primary selectors in the first stage and several sub-groups of secondary selectors in the second stage.

The primary and secondary selectors, or selectors "A" and "B," have a capacity of 50 outlets. They do not form link circuits, such as those employed in the cross-bar system; but when a call is handled, a selection is made in a consecutive manner by a selector "A" and by a selector "B".

When a selector "A" is in the selective position, it carries out a test operation on the outlets each terminating on the selector "B," and, in doing this, makes sure not only that the selector "B" itself is free, but also directly tests the presence in the multipling of this selector "B" of a free circuit in the desired direction. It is consequently unnecessary for the selector "A" to select a particular sub-group of selectors "B"; it can test a selector "B" of any sub-group, provided that said selector gives access to a free outlet in the desired direction. The selector "A" "sees" through the selector "B" whether it can find in the desired direction a free outlet connected to said selector "B." The outlets of each direction are also distributed over all the sub-groups of the selectors "B" and each selector "A" has access to some selectors "B" in each sub-group; consequently, wide possibilities are provided for a two-stage selector to have access to any free outlet of any group, in any time unit.

Moreover, by broadly calculating the number of "B" selectors, there will always be a sufficient number of free selectors even at peak hours; on account of these two considerations, the outlets of each group may be considered as forming a quasi-perfect group which reduces their number to a minimum.

Fig. 7 shows a variant of the same principle in which the "A" selectors have not been shown, since the first group selector for "outgoing" calls plays the part of a selector "A" in combination with the "B" selector.

The two-stage selection stages are successively controlled by means of the same part of a wanted line number, for example a single digit or by a combination of digits.

As a variant, the "A" selectors can select a part of their outlets like ordinary group selectors, and, for this purpose, they do not "see" through the selectors "B." Thus, "A" selectors can give access to one or more local groups of outlets "B" selectors giving access to other junctions.

For local calls, they operate like an ordinary first group selector and to not "see" through the second group selectors. This variant may be useful when there is a small number of outgoing directions.

It will be seen that the operation of the tube $Svd$, Fig. 8, applies a blocking potential to the point C′ as soon as the register has detected an impulse corresponding to the desired time unit and before the next impulse has been sent beyond the point C′. As the impulse circuit passing through the wire $f'$ is common to a multiswitch having a multipling of outlets peculiar to it and quite separate from the multiplings of circuits of other secondary multiswitches, it is impossible for another register to select the same outlet already selected in the case in which there was only a single free outlet in the desired group.

The blocking is maintained as long as a free outlet in the desired group is selected by the secondary switch which has been chosen. During this period and when the relay SB (Fig. 4) has been energised, the transmission back of impulses by the transformer ST2 through wires $f'$ is still prevented owing to the fact that the relay SB has opened its contact $sb2$. When relay SB releases, the other secondary switches of this secondary multiswitch again receive selective impulses through their wires $f'$. It will be seen that a group of outlets multipled on several secondary switches is artificially busied from the moment when one of said secondary switches is selected until an outlet in said group is seized and busied through said secondary switch. Consequently, it will be seen that two primary switches cannot seize and hold two secondary switches in order to have access to the same group of outlets when there is only a single outlet of said group available for each of these two secondary switches and when the outlets available for the two secondary switches only form one single circuit.

Each secondary multiswitch preferably has access to one or more outlets of each of the groups which can be reached through the two-stage selection stage; the outlets which can be reached by the switches of each secondary multiswitch may be reached through said switches and through no other secondary switch, each multiswitch having a multipling of outlets peculiar to it. Two or more secondary switches of the same multiswitch cannot correspond to the same test time unit in the different primary multiswitches in accordance with rule 4 previously indicated.

It will be noted that the electronic impulse gate devices $Rg$, ARCS, ARCP, BRCS, BRCP in the common circuit associated with the primary multiswitch, Figs. 3 and 8, scan the outlets of all the secondary switches connected to the outlets of any primary switch of the primary multiswitch. The register, as also these scanning devices, form, in combination electronic means for successively testing the availability of one group among the outlets of all the secondary switches connected to the outlets of a single primary switch.

The equipment shown on the right of wire $f'$ in Fig. 8 constitutes a means of signalling by electrical impulses situated in time, said means being adapted to signal the condition of availability of the groups of outlets of the secondary switches. If a secondary multiswitch only has access to a single outlet of a particular group, the free condition relates to a single outlet instead of a group. The register constitutes a test device for selecting a free switch of the second stage by detecting a signal made up of an impulse in a particular time unit by setting the digit registering devices.

It will be seen in Figs. 4 and 8, that each outlet of a secondary switch can, when it is free, cause the transmission of group impulses corresponding to the group to which it belongs, in order to control the selection of a secondary switch by a primary switch. When one or more outlets in a group are free, the result is the same as long as it is a question of test conditions of groups for the control of selection by the primary switches. A secondary multiswitch is adapted to send back a train of group impulses to the primary switches, one for each group having at least one free outlet in the banks of the multiswitch. The group impulses can be applied directly to the outlets, as in Fig. 4, or produced from a direct current by employing impulse gates, as in Fig. 8.

While the principles of the invention have been described above in connection with specific embodiments, and particular modifications thereof, it is to be clearly understood that this description is made only by way of example and not as a limitation on the scope of the invention.

What is claimed is:

1. Two-step group selector equipment for use in telecommunication systems comprising a plurality of primary switches, a plurality of secondary switches, interconnections between said primary and secondary switches, secondary outlet circuits for respective outlets of said secondary switches, a first scanning means connected to the secondary outlet circuits associated with the outlets of said secondary switches and adapted to produce an impulse for each free secondary circuit, the time position of said impulse identifying the group containing the associated secondary outlet circuit, means for selecting only those impulses representing a desired group of secondary outlet circuits, means controlled by said first scanning means and responsive to one of said selected impulses for causing a primary switch to select an idle secondary switch giving access to outlets associated with said desired group of secondary outlet circuits in which there is at least one idle secondary outlet circuit, a second scanning means associated with said selected secondary switch and connected to secondary outlet circuits for the outlets of said secondary switches and adapted to produce an impulse for each free secondary outlet circuit, the time position of said impulse identifying said secondary outlet circuit, and means controlled by the action of said primary switch in selecting said secondary switch and by said impulse selecting means for thereupon causing the selected secondary switch to select an idle outlet in the group of outlets associated with the desired group of secondary outlet circuits.

2. Two-step group selector equipment, as claimed in claim 1, in which both the scanning means comprise electronic means for scanning the secondary outlet circuits of all the secondary switches connected to the outlets of one primary switch.

3. Two-step group selector equipment for use in telecommunication systems comprising a plurality of primary switches, a plurality of secondary switches, secondary outlet circuits associated respectively with the outlets of said secondary switches, electronic time pulse signalling means connected to the secondary outlet circuits associated with the outlets of said secondary switches for signalling the idle condition of groups of secondary outlet circuits independently of said primary switches, settable group-pulse-selecting means, test means connected to said group-pulse-selecting means and to said signalling means and controlled by said signalling means for causing said primary switch to select an idle secondary switch giving access to the group of outlets associated with the secondary outlet circuits selected by said group-pulse-selecting means in which there is at least one idle secondary outlet circuit, means connected to the selected secondary switch and rendered operative by the selection of said secondary switch and thereupon causing the selected secondary switch to select an idle outlet associated with a secondary outlet circuit in said selected group of circuits, said test means being adapted to detect a signal pulse in a time position determined by the setting of said group-pulse-selecting means.

4. Two-stage group selector equipment, as claimed in claim 1, in which the second scanning means comprises electronic signalling means associated with the secondary switch and controlled by the second scanning means for signalling back to the primary switch connected thereto the condition of availability within each in turn of a plurality of different groups of secondary outlets of circuits associated with said secondary switch.

5. Two-step group selector equipment, as claimed in claim 4, in which the means for causing the primary switch to select a secondary switch comprises test means associated with a primary switch for comparing group availability impulses received back from secondary switches with the impulses selected by the setting of the means for selecting impulses of a desired group 6. Two-step group selector equipment, as claimed in claim 5, in which the second scanning means associated with each secondary switch includes signalling means common to a number of secondary switches to which the same set of outlets is multipled.

7. Two-step group selector equipment, as claimed in claim 6, further comprising means for artificially busying a group of secondary outlet circuits multipled to a plurality of secondary switches from the moment one of said secondary switches is selected for extending a connection to an outlet associated with a secondary outlet circuit of said group until an outlet associated with a secondary outlet circuit in said group is seized and busied via said secondary switch.

8. Two-step group selector equipment, as claimed in claim 7, in which the secondary scanning means comprises a common control circuit associated with a group of secondary switches to all of which the same set of outlets is multipled, test leads individual to each secondary outlet circuit associated with an outlet of said set, a common test lead in said common control circuit to which said individual test leads are connected, a plurality of pulse sources, means for applying electrical pulses from said sources in different time positions to said common test lead, one for each different group of outlets in said set of outlets, said pulse applying means applying a pulse in a time position identifying a particular group of outlets only when at least one of the said outlets of said group is idle.

9. Two-step group selector equipment, as claimed in claim 3, in which the test means comprises a test lead individual to each outlet from a secondary switch, and means for applying a pulse to each individual test lead in the time position identifying the group of outlets to which said individual test lead belongs, and a common test lead to which said individual test leads are connected and which in turn acts as the test lead to the primary switches having access to said switch.

10. Two-step group selector equipment, as claimed in claim 9, in which the test means comprises pulse gating equipment associated with each primary switch to which the test leads of all the secondary switches connected to said primary switch are connected and including means under control of group pulses of the same time cycle on test leads from different secondary switches for producing a cycle of time-spaced pulses equal in number to the aggregate number of group pulses on all said test leads, the time position of each pulse identifying an outlet group and the secondary switch from which said outlet group signal originated, group test equipment, means for passing said cycle of pulses to said group test equipment, group-pulse-selecting means arranged to control said group test equipment to detect the first pulse in said pulse cycle identifying a free outlet in a wanted group, means for registering the identity of the secondary switch from which the detected pulse originated, and means in said identity register means for controlling the setting of the primary switch to the secondary switch the idenity of which has been registered.

11. Two-step group selector equipment, as claimed in claim 10, in which the test means comprises pulse gating equipment associated with each secondary switch and including means under control of group pulses of the same time cycle on the individual test leads of different idle outlets for producing a sequence of time-spaced pulses equal in number to group pulses on the individual test leads, the time position of each pulse in the sequence identifying the outlet group and the particular outlet, a sequence channel for passing said pulse sequence to said group test equipment used for setting the primary switches, said group test equipment being arranged to detect the first pulse in said pulse sequence identifying a free outlet in the same wanted group, means for registering the identity of the outlet from which the detected pulse originated, and means in said identity registering means for controlling the setting of the secondary switch to the outlet the identity of which has been registered.

12. Two-step selector equipment, as claimed in claim 11, further comprising means for automatically making said electrical time pulse signalling means pulse absorbing immediately the corresponding secondary switch has been selected, whereby secondary selectors having access to the same single free outlet in a wanted group cannot be seized by two different primary switches for making connections in said group.

13. Two-step selector equipment, as claimed in claim 12, further comprising means connected to the common test lead for automatically maintaining a pulse absorbing condition until an idle outlet in the wanted group has been selected and busied in the selected secondary switch.

14. A two-step group selector equipment for use in telecommunication systems comprising a plurality of secondary switches, a plurality of primary switches having access to said secondary switches, a register, pulse source means for producing first and second groups of time-positioned pulses, each having a predetermined cycle of repetition, each pulse of said second group being equal in time duration to the time duration of a predetermined plurality of pulses of said first group, said predetermined plurality of pulses of said first group being representative respectively of the outlets of each of said primary and secondary switches, and the pulses of said second group being representative respectively of groups of outlets of said secondary switches, comparing means in said register, group pulse selecting means in said register adapted to be set so as to apply a pulse of said second group of pulses, representative of a group of outlets of a secondary switch, one of which outlets it is desired to select, from said pulse source means to said comparing means, a primary switch control circuit common to a plurality of primary switches, a secondary switch control circuit common to a plurality of secondary switches, means in said secondary switch control circuit for transmitting pulses, representative of groups of secondary switch outlets containing at least one idle outlet, from said pulse source means to said primary switch control circuit, means in said primary switch control circuit responsive to pulses received from said secondary switch control circuit for transmitting certain pulses from said pulse means to said comparing means, said last mentioned pulses being of said first group and representative respectively of outlets of a seized primary switch which have access to secondary switches having idle outlets, said comparing means under control of said group-pulse-selecting means adapted to select the first pulse received by it which represents an outlet of said seized primary selector switch which has access to a secondary switch having an idle outlet in the desired group of outlets, means connected to said comparing means for transmitting said selected pulse to said primary switch control circuit, and means in said primary switch control circuit responsive to the receipt of said pulse for operating said seized primary switch to connect to a secondary switch having a free outlet in the desired group.

15. A two-step group selector equipment for use in telecommunication systems, as claimed in claim 14, further comprising means responsive to the connection of a primary switch to a secondary switch for disconnecting the primary switch control circuit from the register and connecting the secondary switch control circuit to said register, means in the secondary switch control circuit responsive to the seizure of a secondary switch for transmitting certain pulses from the pulse source means to the comparing means in the register, said last mentioned pulses being of the first group representative of idle outlets, each occurring at a time period within a pulse of the second group which identifies the group of the outlet, whereby the transmitting means connected to said comparing means will transmit the first selected pulse representative of an idle outlet in the selected group to said secondary switch control circuit, and means in said secondary switch control circuit, responsive to said last-mentioned pulse for operating said seized secondary switch to connect to the outlet represented by said last-mentioned pulse.

References Cited in the file of this patent

UNITED STATES PATENTS

| | | |
|---|---|---|
| 2,291,036 | Hall | July 28, 1942 |
| 2,310,452 | Meacham et al. | Feb. 9, 1943 |
| 2,326,478 | Meacham | Aug. 10, 1943 |
| 2,348,626 | Holden | May 9, 1944 |
| 2,506,613 | Ransom | May 9, 1950 |
| 2,582,959 | Bruce et al. | Jan. 22, 1952 |
| 2,619,548 | Lesti | Nov. 25, 1952 |